(12) United States Patent
Chang et al.

(10) Patent No.: US 8,641,216 B2
(45) Date of Patent: Feb. 4, 2014

(54) BACKLIGHT MODULE AND DISPLAY APPARATUS

(75) Inventors: Kuang-yao Chang, Shenzhen (CN); Jing Zhang, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 377 days.

(21) Appl. No.: 13/145,074

(22) PCT Filed: May 5, 2011

(86) PCT No.: PCT/CN2011/073687
§ 371 (c)(1),
(2), (4) Date: Jul. 18, 2011

(87) PCT Pub. No.: WO2012/145934
PCT Pub. Date: Nov. 1, 2012

(65) Prior Publication Data
US 2012/0275137 A1    Nov. 1, 2012

(51) Int. Cl.
*G09F 13/04* (2006.01)
*G02F 1/13357* (2006.01)

(52) U.S. Cl.
USPC .................... 362/97.1; 362/97.2; 362/217.17

(58) Field of Classification Search
USPC ...................... 362/97.1, 97.2, 217.15, 217.17
See application file for complete search history.

(56) References Cited

U.S. PATENT DOCUMENTS

| | | | |
|---|---|---|---|
| 2004/0257796 A1 | 12/2004 | Huang et al. | |
| 2007/0195554 A1 | 8/2007 | Kim | |
| 2010/0008065 A1* | 1/2010 | Naito | 362/97.1 |

FOREIGN PATENT DOCUMENTS

| | | |
|---|---|---|
| CN | 1521546 A | 8/2004 |
| CN | 1588194 A | 3/2005 |

* cited by examiner

*Primary Examiner* — David V Bruce
(74) *Attorney, Agent, or Firm* — Ditthavong Mori & Steiner, P.C.

(57) ABSTRACT

The present invention provides a backlight module and a display apparatus. The display apparatus comprises the backlight module and a display panel. The backlight module comprises a plurality of lamps; and a ground bar disposed at one side of the lamps, wherein low-voltage sides of the lamps are electrically connected to the ground bar, and the ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane. The present invention can improve the assembly accuracy of the backlight module.

17 Claims, 2 Drawing Sheets

BACKLIGHT MODULE AND DISPLAY APPARATUS

FIELD OF THE INVENTION

The present invention relates to a backlight module and a display apparatus, and more particularly to a direct-light type backlight module and a display apparatus using the same.

BACKGROUND OF THE INVENTION

Liquid crystal displays (LCDs) have been widely applied in electrical products. Currently, most LCDs are backlight type LCDs that comprise a liquid crystal panel and a backlight module. According to the position of the light sources for providing LCDs with backlight, the backlight module can be classified into a side-light type or a direct-light type.

Taking the direct-light type backlight module for example, the backlight module uses lamps to be light sources for providing a back-light to the liquid crystal panel. In a unidirectional high-voltage structure, ends (low-voltage sides) of the lamps are required to be connected to a metal bar for grounding.

However, when the low-voltage sides of the lamps are connected to the metal bar, the low-voltage sides of the lamps are difficult to align with metal bar, and thus the other ends (high-voltage sides) of the lamps can not be positioned at the same reference line, resulting in the difficulty in assembling the backlight module As a result, it is necessary to provide a backlight module and a display apparatus to solve existing problems in conventional technologies such as above-mentioned.

SUMMARY OF THE INVENTION

The present invention provides a backlight module and a display apparatus to solve the assembly problems of the backlight module.

A primary object of the present invention is to provide a backlight module, comprising: a plurality of lamps; and a ground bar disposed at one side of the lamps, wherein low-voltage sides of the lamps are electrically connected to the ground bar, and the ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane.

Another object of the present invention is to provide a backlight module, comprising: a plurality of lamps; and a metal ground bar disposed at one side of the lamps, wherein low-voltage sides of the lamps are electrically connected to the metal ground bar, and the metal ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane, and lead wires disposed at the low-voltage sides of the lamps are welded and connected to the horizontal supporting plane or the alignment plane of the metal ground bar.

Still another object of the present invention is to provide a display apparatus, wherein the display apparatus comprises: a display panel; and a backlight module comprising: a plurality of lamps; and a ground bar disposed at one side of the lamps, wherein low-voltage sides of the lamps are electrically connected to the ground bar, and the ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane.

In one embodiment of the present invention, the low-voltage sides of the lamps are electrically connected to the horizontal supporting plane or the alignment plane.

In one embodiment of the present invention, the predetermined angle between the horizontal supporting plane and the alignment plane is 90 degrees.

In one embodiment of the present invention, the predetermined angle between the horizontal supporting plane and the alignment plane is less than 90 degrees.

In one embodiment of the present invention, the predetermined angle between the horizontal supporting plane and the alignment plane is larger than 90 degrees.

In one embodiment of the present invention, the lead wires disposed at the low-voltage sides of the lamps are welded and connected to the horizontal supporting plane or the alignment plane of the ground bar.

In one embodiment of the present invention, the ground bar is composed of two metal bars.

In one embodiment of the present invention, the ground bar is a metal bar.

In the backlight module and the display apparatus of the present invention, the lamps can be precisely aligned on the back bezel by using the ground bar, thereby greatly improving the assembly accuracy of the backlight module.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
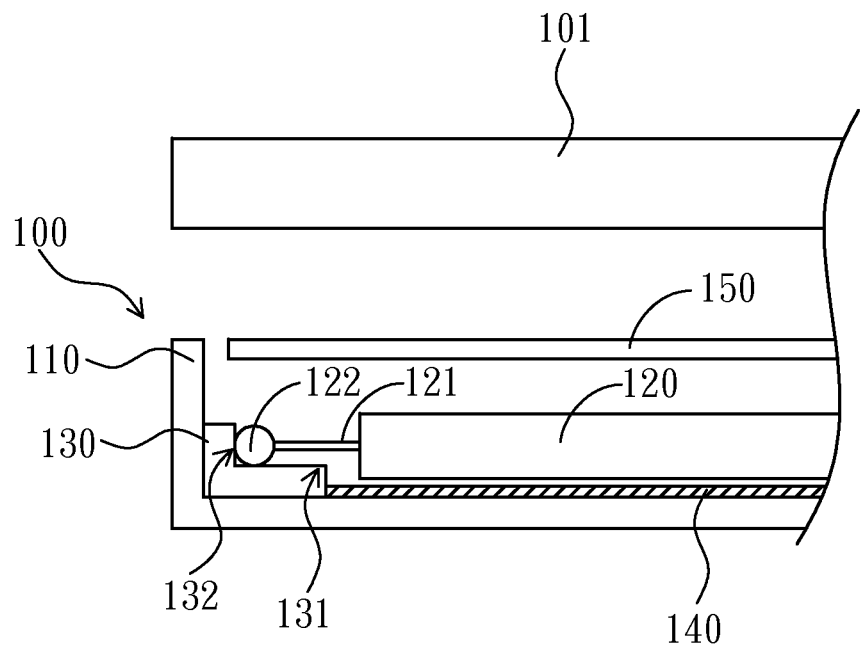
FIG. 1 is a partially cross-sectional view showing a backlight module and a display panel according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a partially cross-sectional view showing a backlight module and a display panel according to a first embodiment of the present invention is illustrated. The backlight module 100 of the present embodiment may be a direct-light type backlight module disposed opposite to a display panel 101, thereby forming a display apparatus (such an LCD apparatus). The display panel 101 may be a liquid crystal display panel. The backlight module 100 may comprises a back bezel 110, a plurality of lamps 120, a ground bar 130, a reflective layer 140 and at least one optical film 150.

Referring to FIG. 1 again, the back bezel 110 of the present embodiment may be made of an opaque material, such as plastic, metal or any combination material thereof for carrying the lamps 120, the ground bar 130, the reflective layer 140 and the optical film 150. The lamps 120 may be cold cathode fluorescent lamps (CCFLs) which are arranged on the back bezel 110 and space at predetermined intervals for providing a backlight to the display panel 101. In the present embodiment, each of the lamps 120 has a low-voltage side and a high-voltage side.

Figure 2:
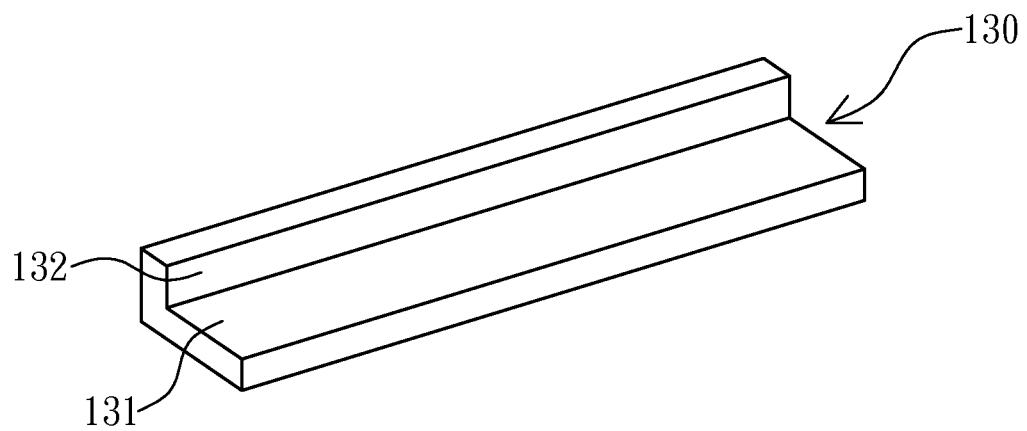
FIG. 2 is a perspective view of the ground bar according to a first embodiment of the present invention.

Referring to FIG. 1 and FIG. 2, FIG. 2 is a perspective view of the ground bar according to a first embodiment of the present invention. The ground bar 130 is disposed on the back bezel 110 and positioned at one side of the lamps 120. The low-voltage sides of the lamps 120 are electrically connected to the ground bar 130 for grounding. The ground bar 130 has a horizontal supporting plane 131 and an alignment plane 132, and there is a predetermined angle between the horizontal supporting plane 131 and the alignment plane 132. The horizontal supporting plane 131 is substantially parallel to the lamps 120 or lead wires 121 thereof. The low-voltage sides of the lamps 120 (the lead wires 121 or electrodes) are electrically connected to the horizontal supporting plane 131 or the alignment plane 132, so as to be electrically connected to ground. At this time, the low-voltage sides of the lamps 120 can be supported on the horizontal supporting plane 131 and abut against the alignment plane 132. The low-voltage sides of the lamps 120 (the lead wires 121) can be securely supported on the horizontal supporting plane 131, and the alignment plane 132 can act as a reference straight line for aligning the lamps 120, thereby flushing the lamps 120 with the alignment plane 132. Therefore, the lamps 120 can be precisely aligned on the back bezel 110 by the using the alignment plane 132 of the ground bar 130.

Referring to FIG. 1 again, in this embodiment, the ground bar 130 may be made as one-piece by extrusion molding, stamping, cutting, casting, machining, compression molding or forging. At this time, the ground bar 130 has an L-shaped profile or cross-section, and the predetermined angle between the horizontal supporting plane 131 and the alignment plane 132 may be 90 degrees.

Referring to FIG. 1 again, in this embodiment, the ends of the lead wires 121 of the lamps 120 abut against the alignment plane 132 of the ground bar 130 for aligning the lamps 120 on the back bezel 110. At this time, the lead wires 121 can be welded and connected to the horizontal supporting plane 131 or the alignment plane 132, thereby forming welding points 122 at the ends of the lead wires 121 and allowing the low-voltage sides of the lamps 120 to be electrically connected to the ground bar 130. Since the horizontal supporting plane 131 is parallel to the lamps 120 or lead wires 121 thereof, the lead wires 121 of the lamps 120 can be first supported on the horizontal supporting plane 131 to adjust the predetermined interval between the lamps, thereby facilitating the assembly flexibility.

Referring to FIG. 1 again, the reflective layer 140 of the present embodiment is formed on the back bezel 110. The reflective layer 140 may be for example a reflective film or a reflective coated layer with a light reflective material for reflecting light from the lamps 120. The light reflective material may be for example Ag, Al, Au, Cr, Cu, In, Ir, Ni, Pt, Re, Rh, Sn, Ta, W, Mn, any alloy combination thereof, white reflective paint with etiolation-resistant and heat-resistant properties or any combination thereof, for reflecting light.

Referring to FIG. 1 again, the optical film 150 of the present embodiment may be for example a diffuser, a prism sheet, a turning prism sheet, a brightness enhancement film, a dual brightness enhancement film, a diffused reflective polarizer film or any combination thereof, and is disposed above the lamps 120 for optical improvement.

When assembling the lamps 120 on the back bezel 110, firstly, the ends (the low-voltage sides) of the lamps 120 can be supported by the horizontal supporting plane 131. Subsequently, the low-voltage sides (the lead wires 121) of the lamps 120 are allowed to abut against the alignment plane 132 of the ground bar 130, i.e. the ends of the lead wires 121 at the low-voltage sides of the lamps 120 can abut against the alignment plane 132 of the ground bar 130. At this time, the lamps 120 can be easily and precisely aligned to the alignment plane 132. Subsequently, the lead wires 121 of the lamps 120 may be welded and connected to the horizontal supporting plane 131 or the alignment plane 132 of the ground bar 130, thereby allowing the low-voltage sides of the lamps 120 to be electrically connected to the ground bar 130.

Therefore, the lamps 120 on the back bezel 110 can be easily and precisely aligned to a reference straight line (the alignment plane 132) by using the horizontal supporting plane 131 and the alignment plane 132 of the ground bar 130 for improving the assembly accuracy of the backlight module 100.

Figure 3:
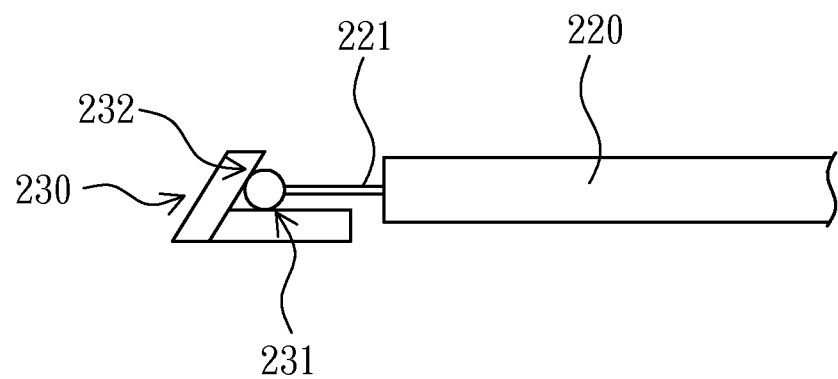
FIG. 3 is a cross-sectional view showing lamps and a ground bar according to a second embodiment of the present invention.

Referring to FIG. 3, a cross-sectional view showing lamps and a ground bar according to a second embodiment of the present invention is illustrated. Only the difference between the embodiment and the first embodiment will be described hereinafter, and thus the similar portions there-between will be not stated in detail herein. In comparison with the first embodiment, the ground bar 230 of the second embodiment may be composed of two metal bars and have a horizontal supporting plane 231 and an alignment plane 232, wherein the predetermined angle between the horizontal supporting plane 231 and the alignment plane 232 may be less than 90 degrees. When assembling the lamps 220 and the ground bar 230, the lead wires 221 of the lamps 220 can be supported on the horizontal supporting plane 231, and the ends of the lead wires 221 at the low-voltage sides of the lamps 220 are allowed to abut against the alignment plane 232 of the ground bar 230.

Figure 4:
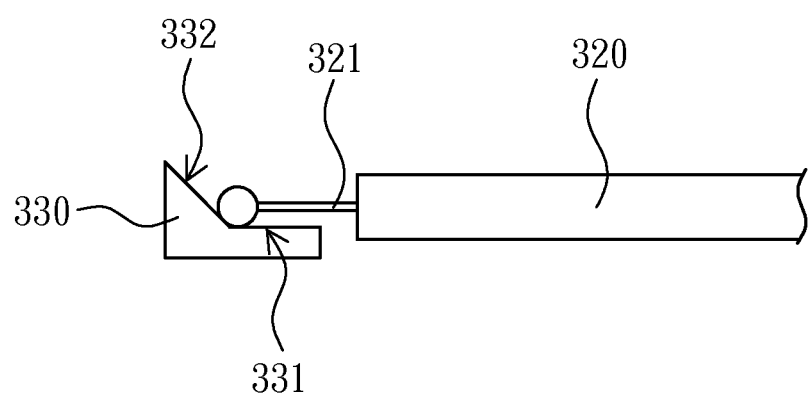
FIG. 4 is a cross-sectional view showing lamps and a ground bar according to a third embodiment of the present invention.

Referring to FIG. 4, a cross-sectional view showing lamps and a ground bar according to a third embodiment of the present invention is illustrated. Only the difference between this embodiment and the first embodiment will be described hereinafter, and thus the similar portions there-between will be not stated in detail herein. In comparison with the first embodiment, the ground bar 330 of the third embodiment may be a metal bar having a horizontal supporting plane 331 and an alignment plane 332, wherein the predetermined angle between the horizontal supporting plane 331 and the alignment plane 332 may be larger than 90 degrees. When assembling the lamps 320 and the ground bar 330, the lead wires 321 of the lamps 320 can be supported on the horizontal supporting plane 331, and the ends of the lead wires 321 at the low-voltage sides of the lamps 320 are allowed to abut against the alignment plane 332 of the ground bar 330.

As described above, in the backlight module and the display apparatus of the present invention, the lamps can be precisely aligned on the back bezel by using the ground bar, thereby reducing the assembly difficulty and improving the assembly accuracy of the backlight module.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
 a plurality of lamps; and
 a metal ground bar disposed at one side of the lamps, wherein low-voltage sides of the lamps are electrically connected to the metal ground bar, and the metal ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane, and lead wires disposed at the low-voltage sides of the lamps are welded and connected to the horizontal supporting plane or the alignment plane of the metal ground bar.

2. A backlight module, comprising:
 a plurality of lamps; and
 a ground bar disposed at one side of the lamps, wherein low-voltage sides of the lamps are electrically connected to the ground bar, and the ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane.

3. The backlight module according to claim 2, wherein the low-voltage sides of the lamps are electrically connected to the horizontal supporting plane or the alignment plane.

4. The backlight module according to claim 2, wherein the predetermined angle between the horizontal supporting plane and the alignment plane is 90 degrees.

5. The backlight module according to claim 2, wherein the predetermined angle between the horizontal supporting plane and the alignment plane is less than 90 degrees.

6. The backlight module according to claim 2, wherein the predetermined angle between the horizontal supporting plane and the alignment plane is larger than 90 degrees.

7. The backlight module according to claim 2, wherein lead wires disposed at the low-voltage sides of the lamps are welded and connected to the horizontal supporting plane or the alignment plane of the ground bar.

8. The backlight module according to claim 2, wherein the ground bar is composed of two metal bars.

9. The backlight module according to claim 2, wherein the ground bar is a metal bar.

10. A display apparatus, comprising:
 a display panel; and
 a backlight module comprising:
  a plurality of lamps; and
  a ground bar disposed at one side of the lamps, wherein low-voltage sides of the lamps are electrically connected to the ground bar, and the ground bar has a horizontal supporting plane and an alignment plane, and there is a predetermined angle between the horizontal supporting plane and the alignment plane, the horizontal supporting plane is parallel to the lamps, and the low-voltage sides of the lamps are supported on the horizontal supporting plane and abut against the alignment plane.

11. The display apparatus according to claim 10, wherein the low-voltage sides of the lamps are electrically connected to the horizontal supporting plane or the alignment plane.

12. The display apparatus according to claim 10, wherein the predetermined angle between the horizontal supporting plane and the alignment plane is 90 degrees.

13. The display apparatus according to claim 10, wherein the predetermined angle between the horizontal supporting plane and the alignment plane is less than 90 degrees.

14. The display apparatus according to claim 10, wherein the predetermined angle between the horizontal supporting plane and the alignment plane is larger than 90 degrees.

15. The display apparatus according to claim 10, wherein lead wires disposed at the low-voltage sides of the lamps are welded and connected to the horizontal supporting plane or the alignment plane of the ground bar.

16. The display apparatus according to claim 10, wherein the ground bar is composed of two metal bars.

17. The display apparatus according to claim 10, wherein the ground bar is a metal bar.

* * * * *